United States Patent [19]
Salcedas et al.

[11] Patent Number: 5,652,565
[45] Date of Patent: Jul. 29, 1997

[54] AUTO BRAKE LIGHT

[76] Inventors: Ana S. Salcedas, 308 N. Fork Landing Rd., Maple Shade, N.J. 08052; Armenio N. Silva, 5110 Arendale Ave., Philadelphia, Pa. 19114

[21] Appl. No.: 571,522

[22] Filed: Dec. 13, 1995

[51] Int. Cl.$^6$ ............................................. B60Q 1/44
[52] U.S. Cl. ......................... 340/479; 340/467; 40/591
[58] Field of Search ......................... 340/479, 467, 340/464, 468, 469, 471, 463; 359/642; 40/591, 564, 580; 362/32

[56] References Cited

U.S. PATENT DOCUMENTS

| | | | |
|---|---|---|---|
| 203,011 | 9/1878 | McElliott | 340/479 |
| 1,898,655 | 2/1933 | Chauvet | 40/573 |
| 2,077,461 | 4/1937 | Condon | 177/329 |
| 2,166,862 | 7/1939 | Foster | 177/329 |
| 2,474,610 | 6/1949 | Wunsch | 340/467 |
| 3,226,707 | 12/1965 | Newman et al. | 340/326 |
| 4,264,979 | 4/1981 | Gutowski | 455/77 |
| 4,631,516 | 12/1986 | Clinker | 340/472 |
| 4,736,280 | 4/1988 | Simidian | 362/80 |
| 4,745,525 | 5/1988 | Sheehy | 340/479 |

FOREIGN PATENT DOCUMENTS

| | | | |
|---|---|---|---|
| 594207 | 9/1925 | France | 340/109 |
| 3731705 | 6/1989 | Germany . | |

*Primary Examiner*—Jeffery Hofsass
*Assistant Examiner*—Anh La
*Attorney, Agent, or Firm*—Lennox & Murtha, P.A.

[57] ABSTRACT

A vehicle brake light device and system for use with a vehicle having a brake light assembly including a lens and a source of illumination directed toward the lens. The device comprises a background lens having a reverse side facing the source of illumination. The background lens transmits light emitted from the source of illumination towards an observer and includes at least one template of a predetermined shape. At least one indicia is included that has an obverse side also facing the observer and a reverse side facing the source of illumination. The indicia is also capable of transmitting light toward the observer. The indicia each have a predetermined shape corresponding to a template wherein the indicia are mounted within a corresponding template. The indicia are intended to convey a message to the observer when the device is in an active state. A seal is preferably mounted between the indicia and its corresponding template to provide a water tight seal therebetween. In the preferred embodiment, the indicia are mounted within cavities formed by the templates in the reverse side of the lens.

15 Claims, 2 Drawing Sheets

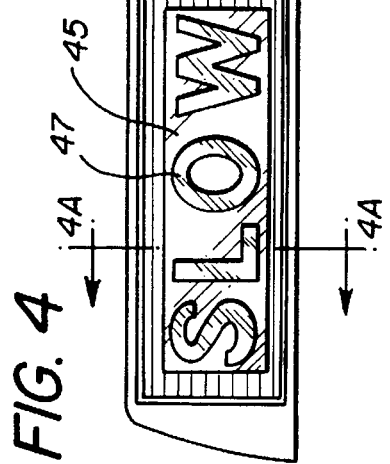
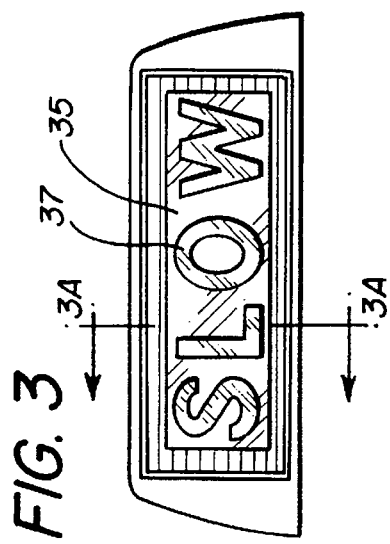
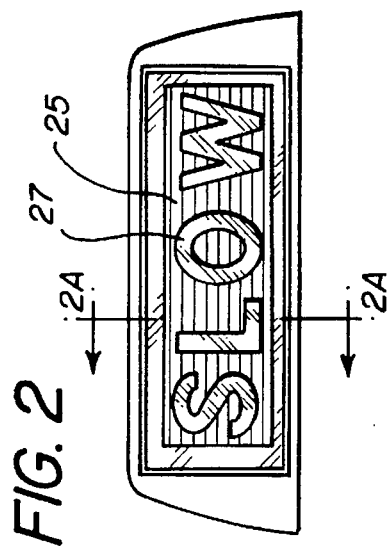
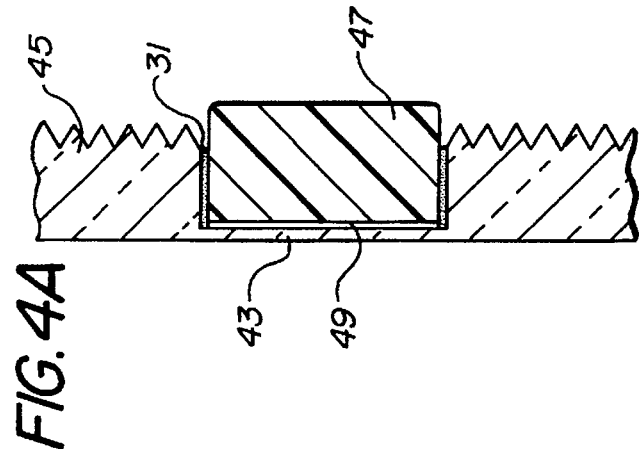
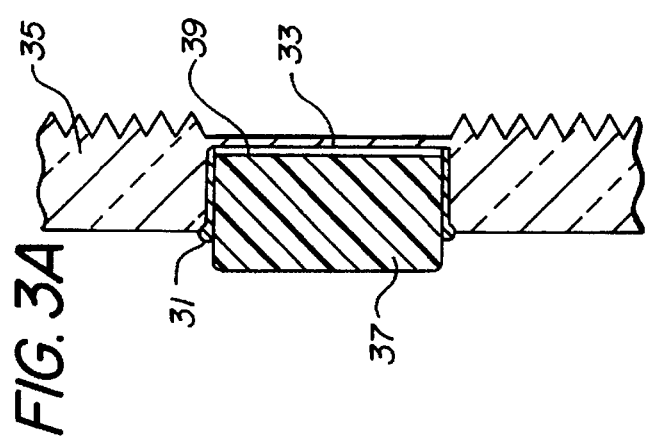
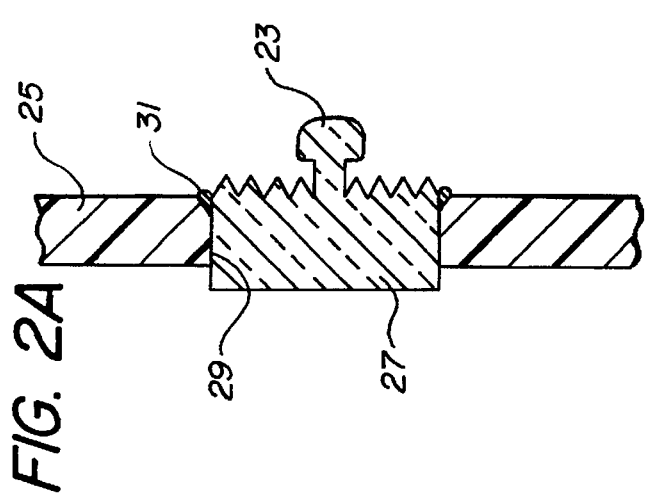

AUTO BRAKE LIGHT

FIELD OF THE INVENTION

The present invention relates to indicator lights for motor vehicles. More particularly, the invention relates to a signal device in which a message is displayed to other motorists and observers to the rear of the vehicle, such as when the vehicle's brake pedal is depressed to advise those motorists and observers of the deceleration of the vehicle so that they may take appropriate action.

BACKGROUND OF THE INVENTION

Vehicle indicator lights such as turn lights, backup lights, and brake lights are ubiquitous in this age of personal motor vehicles. Motorized on-road vehicles are required by law to have indicator lights positioned on the vehicle to signal the intentions of the vehicle operator. Amber or yellow turn lights are positioned on the front, rear and sometimes on the sides of vehicles to indicate the direction that the vehicle operator intends to turn the vehicle. White backup lights are positioned on the rear of vehicles to indicate to other vehicles and pedestrians that the vehicle operator has placed the vehicle in reverse gear. Red stop or brake lights are positioned on the rear of the vehicles to indicate to following vehicles that the vehicle operator has depressed the brake pedal, engaging the vehicle's braking system, slowing or stopping the vehicle. From time to time indicator lights have been modified to further clarify and indicate the motorist's intentions above displaying just the color and position of the indicator light relative to the vehicle by including indicia in conjunction with the indicator light.

Some devices use indicator lights that have been modified to display a stylized arrow pointed towards the direction of intended travel and/or words that indicate the intended change of vehicle direction. For example, one such device is an indicator light device disclosed in U.S. Pat. No. 1,898,655 to Oliver D. Chauvet. Chauvet discloses a device to be affixed to the front and rear of a vehicle and comprises a rectangular box shaped frame with hinged, angled left and right sides that form triangular shaped sides pointing to the left and right sides of the vehicle, respectively. The central, rectangular portion of the device is divided into three roughly equally sized smaller compartments by two internal horizontal walls. Each compartment has a glass pane forming its outward facing side. Disposed over each glass pane is a stencil with the words "RIGHT," "TURN," and "LEFT" cut therein, such that these words stand out when the light is turned on. The middle glass pane may also be embossed with the word "TURN" therein, and forms the shaft of either a right or left turn arrow depending upon which light bulb is illuminated.

Another example of this type of device is disclosed in U.S. Pat. No. 2,077,461 to Edward T. Condon. Condon discloses three signal lamps with electric lights affixed to the front and rear of a vehicle. Either a stencil plate is disposed behind each lamp lens, or each lamp lens is rendered opaque except for a predetermined portion, such that each lamp displays an appropriate directional design when illuminated by the electric lights. The lamps display the desired color by the use of a transparent or translucent colored disk located behind each design bearing lens.

Another indicator light device is disclosed in U.S. Pat. No. 2,166,862 to Isaac Owen Foster. Foster discloses a device to be affixed to the front and rear, and/or the top of a vehicle and comprises a housing within which are positioned right and left hand arrow tubes each bent to form arrow heads at their outer end and tails at their inner end. Within the space defined by parallel branches and angular tubes is placed suitable indicia formed from, for example, a single tube shaped into the word "TURN." The tubes are filled with a gas to impart a color upon illumination and the specific indicia tube may display a contrasting color to the other tubes.

A further indicator light device is disclosed in U.S. Pat. No. 4,736,280 to Ara V. Simidian. Simidian discloses a device that consists of an automobile brake warning safety and directional indicator lights combined with a dispenser for paper towels or paper tissues that is preferably mounted in the center of the automobile's rear window platform. Mounted to the rear of the dispenser is a rearward facing, horizontal illumination housing divided into three compartments each housing a lamp socket and lamp. A panel is mounted to the illumination housing and has a brake warning safety and directional indicator indicia thereon which overlies a respective illumination compartment. When braking, the brake warning safety indicia is illuminated to warn following drivers of the vehicle's deceleration. Similarly, when the vehicle's turn signals are activated, the appropriate directional indicia is illuminated to advise following drivers of the vehicle's impending turn.

Another indicator light device disclosed in French Patent No. 594,207 to M. Eugéne Meylan. Meylan discloses a device mounted at the center rear of a vehicle that is roughly similar in shape and compartmentalization to the Chauvet device except that each of the three horizontal compartments have opposing light sockets and light bulbs at each side thereof, and the opposing rectangular shaped sides each have a light socket and light bulb. Overlying the device is a transparent or translucent covering with brake warning safety and directional indicator indicia thereon, each overlying a respective lighted compartment and rectangular shaped side. A second embodiment of the Meylan Patent uses a smaller, circular turn indicating device apparently mounted at either side of the rear of the vehicle.

A common disadvantage of each of these above described devices is that the indicia may be seen when they are not illuminated. More importantly, ambient light, such as sunlight, may strike the indicia which following vehicle operators may perceive as intentional illumination of the indicia, thereby giving false or contradictory messages. The devices are all relatively complicated and involve a number of parts that are not part of the vehicle's original equipment. Moreover, these devices are not suitably interchangeable between vehicles of different manufacture.

Other prior indicator light devices are designed to signal or advise other vehicles or pedestrians of specific information, status or warnings. For example U.S. Pat. No. 3,226,707 to Herman Newman discloses a device that can display several illuminated messages such as "DIM LIGHTS," "DON'T TAILGATE," "BACK SOON," and "DOCTOR ON CALL" in the vehicle's rear window. The desired messages are sequentially placed as indicia on translucent tape mounted on rollers proximate an illuminated opening such that the driver can select which message to display and illuminate. The rollers are turned by an electric motor to present the desired message through the housing opening mounted in the vehicle's rear window platform and then illuminated to display the message to following vehicles or pedestrians at the rear of the parked vehicle. This device is no more than an equivalent to the front signs seen on buses and the like which have messages selected by the operator.

One disadvantage of the Newman device is that it requires multiple moving parts with increased opportunity for failure and the need for repair. The control box is bulky and must be mounted near the driver. Changing a message can distract the driver during the same circumstances about which the driver wishes to advise following vehicles. The display housing is also mounted in the vehicle's rear window platform, potentially obscuring the view of the driver.

Accordingly, it is an object of the present invention to provide a vehicle brake indicator light device that includes brake warning safety indicator indicia that displays a visible message only when illuminated by the vehicle brake lights.

Another object of the present invention is to provide a vehicle brake indicator light device that can be used with existing vehicle brake light equipment and requires no additional wiring or configuration.

Yet another object of the present invention is to provide a vehicle brake indicator light device such that multiple devices are mounted on a vehicle to display one coherent message when activated.

Other objects will appear hereinafter.

SUMMARY OF THE INVENTION

It has now been discovered that the above and other objects of the present invention may be accomplished in the following manner. Specifically, the present invention provides a vehicle brake indicator light device for use with a vehicle having a brake light assembly that includes a lens frame at one end and a source of illumination, such as an electric light bulb, at the other end. The source of illumination is directed towards the lens frame and has an active state when it emits light towards the lens frame and an inactive state when it does not emit light.

The brake light device includes a background lens that is mounted on the vehicle lens frame. The background lens has an obverse side facing an observer and a reverse side facing the source of illumination and is capable of transmitting light emitted during the active state towards the observer. The background lens includes at least one template of a predetermined shape, preferably on its obverse side.

At least one indicia is provided that has a predetermined shape, for example letters spelling "STOP," corresponding to the background lens template such that the indicia is mounted within a corresponding template. It is noted that when the template is on the obverse side of the background lens, a portion of the background lens overlies the indicia. The indicia also has an obverse side facing an observer and a reverse side facing the source of illumination and is capable of transmitting light emitted during the active state towards the observer. It is also possible to use indicia that is not so capable of transmitting light to an observer, but instead blocks or masks light emitted during the active state. When the obverse sides of multiple indicia are directly exposed to the source of illumination, a longitudinal bar or gate made of a clear transparent material capable of transmitting light from the source of illumination towards the indicia may connect each indicia together at their obverse sides for ease of assembly. It is important to construct the mounting connector be as unobtrusive as possible so that the indicia conveying the message is not subverted.

The indicia of the present invention conveys a message to an observer during the active state by providing a contrast to the light emitted from the background lens. The background lens is preferably colored red, as are all brake stop lights, and the indicia is preferably colored white to accentuate the contrast between them to maximize the visibility of the message conveyed by the indicia.

In one embodiment, several brake light devices are used in combination on the vehicle, whereby the conveyed message consists of two or more words or signals so as to read, for example, "SLOW DOWN NOW," to following vehicles.

BRIEF DESCRIPTION OF THE DRAWINGS

For a more complete understanding of the invention, reference is hereby made to the drawings, in which:

FIG. 2 is an enlarged, schematic view of one embodiment of the device of the present invention mounted within a lens frame of an automobile.

FIG. 2A is section view of the device of the present invention taken along line 2A—2A of FIG. 2.

FIG. 3 is an enlarged, schematic view of another embodiment of the device of the present invention mounted within a lens frame of an automobile.

FIG. 3A is section view of the device of the present invention taken along line 3A—3A of FIG. 3.

FIG. 4 is an enlarged, schematic view of yet another embodiment of the device of the present invention mounted within a lens frame of an automobile.

FIG. 4A is section view of the device of the present invention taken along line 4A—4A of FIG. 4.

DETAILED DESCRIPTION OF THE PREFERRED EMBODIMENT

Figure 1:
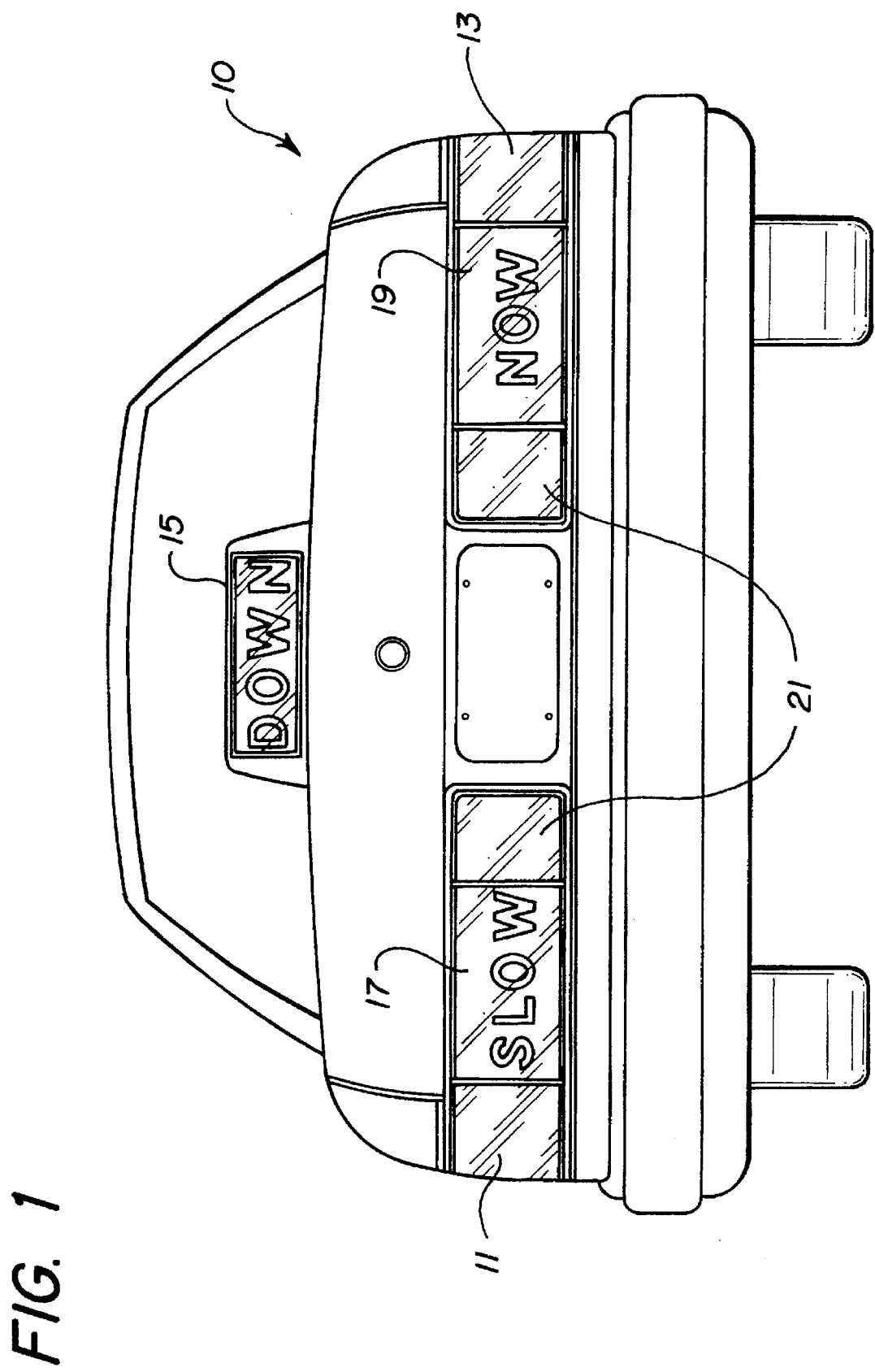
FIG. 1 is a schematic view of the back end or rear of a automobile equipped with a plurality of vehicle brake light devices, all in accordance with the invention.

As shown in the drawings, a vehicle 10 is provided with a plurality of indicator lights, as is the custom and the legal requirement in the United States and other nations that import or export automobiles to and from this country. The vehicle 10 includes left and right turn indicator lights 11 and 13, respectively. It also includes an upper brake light 15 and left and right brake lights 17 and 19. Backup lights 21 are also shown. All of these indicator lights are of standard construction and meet all federal and state law requirements. Original equipment manufacturers and replacement part makers are known to be in compliance with all of the laws and regulations relating to their use in vehicles such as passenger automobiles, trucks and the like.

The present invention relates to the conventional brake light assemblies that are part of the vehicle. Optionally, the present invention may be used with retrofitted light assemblies that are attached to a vehicle after its original manufacture. In either case, the brake light assembly includes a source of light, usually a bulb mounted in a socket at positioned to illuminate toward the rear of the vehicle. Also part of the assembly is a lens of conventional form, properly colored to comply with appropriate regulations. Backup lights are normally white in color, whereas turn lights are amber or yellow. Brake lights are, of course, red, indicating that the vehicle is slowing or stopping, as conditions warrant. It is intended that the present invention be adaptable for use with these conventional brake light assemblies with the originally supplied bulb and the frame into which the original lens is mounted.

As is shown in FIG. 1, the brake lights 15, 17 and 19 each contain indicia in the form of words that are combined to convey the message that the vehicle behind the illustrated vehicle should in fact slow down now. The three brake lights combine to convey this message. Alternatively, two or more of the lights may have the same message, such as the word "stop" for example, or all three may be similarly provided with information indicia. It is also contemplated that only one light on a particular vehicle will have the information indicia of the present invention.

The improvement comprising the present invention is in the lens assembly, not in the mounting bracket or light source that are part of the vehicle. For that reason, the embodiments shown in FIGS. 2, 3 and 4 are illustrated for the upper brake light 15. It is intended that the same modifications may be made to the lenses of brake lights 17 and 19, all in accordance with the spirit of this invention.

FIGS. 2, 3 and 4 illustrate three different embodiments of the present invention as utilized in the raised brake light that has been mandated for automobiles in recent years, each having slightly different features and elements of construction, and all embodying the principles of the invention. FIG. 2 illustrates an embodiment in which the lens 25 has a template cut into its face in a shape corresponding to specific indicia 27 that is intended to be used therewith. Template 29, seen in section view in FIG. 2A, exactly fits indicia 27 so there is no clearance therebetween. Adhesive, glue or another sealing means 31 is employed to maintain the integrity of the brake light assembly.

The indicia 27 form a word of caution that conveys a message in cooperation with the specific condition of the vehicle, because the application of the brake in the car causes the brake light to be illuminated. A driver in a vehicle following the one employing the present invention will see the indicia as soon as it is illuminated by application of the brakes, thus providing a more informative warning of what is occurring in the vehicle directly in front of the driver. As noted, the indicia 27 fit exactly into the templates cut into lens 25, in a manner that is applicable to retrofitting existing lenses. In this embodiment, the separate indicia are all molded in a common mold, with a bar or gate 23 keeping them in alignment until they are inserted into templates 29 as appropriate. The embodiment shown in FIGS. 2 and 2A may have several alternative color schemes. In a simple form, both the lens 25 and the indicia 27 may be red, the color of brake lights generally, but with one being transparent and the other translucent so that a contrast is achieved when the light is illuminated, making the message easier to perceive. Alternately, the lens 25 can be white and translucent with the indicia 27 red and transparent so that the red color complies with safety regulations and the indicia conveys the additional information.

FIGS. 3 and 3A illustrate a different embodiment in which the template is only cut or formed partially into the lens 35 so that a thin wall 33 of the cavity 39 permits individual indicia 37 to be placed therein. Adhesive, glue or another sealing means 31 is employed to maintain the integrity of the brake light assembly. In this embodiment, the lens 35 is preferably red as it would be without the invention and the indicia 37 is a different color, such as white, preferably translucent white. In this manner, the back thin wall 33 is not likely to impart much, if any, color to the internally illuminated indicia 37. When the brake light is off and thus the bulb is not illuminated, the white indicia letters 37 are perhaps visible at normal distances. To remedy this condition, the white indicia 37 is translucent so that it absorbs color from the lens 35, thereby blending in and not contrasting such that the driver in a following vehicle would be alerted or concerned until the brakes are actually applied and the lens 35 illuminated. At this point the translucent white indicia 37 contrast effectively with the red lens 35 to then display the desired message. Again, adhesive, glue or another sealing means 31 is employed to maintain the integrity of the brake light assembly.

FIGS. 4 and 4A represent the preferred embodiment of the present invention, in which the individual indicia 47 are located on the inside of the lens 45, with a thin part 43 of lens 45 covering them to form a front wall to template cavity 49. In this embodiment, it is preferred that the lens 45 is red as would ordinarily be the case, suitable for reflecting light when not illuminated, such as when the car is parked or traveling during daytime without running lights. The indicia 47 are white, translucent letters that may be singly installed into the specific cavity templates 49 or molded together with a gate attachment as previously described with respect to FIG. 2A. In either case, when illuminated by the brake light as the brakes are applied, the sign or information formed by the indicia 47 shows up in excellent contrast with the red illuminated background lens 45.

In any of the above embodiments, the indicia 27, 37 and 47 alternatively may be opaque presenting a sharp contrast with the respective lens 25, 35 and 45 when the light is illuminated to clearly display the intended message while blending in when not illuminated.

While particular embodiments of the present invention have been illustrated and described, it is not intended to limit the invention, except as defined by the following claims.

We claim:

1. A vehicle brake light device for use with a vehicle having a brake light assembly including a lens assembly and a source of illumination directed toward the lens, the source of illumination having an activate state wherein it emits light and an inactive state wherein it does not emit light, the device comprising:

a background lens mounted in said assembly, said lens having an obverse side facing an observer and a reverse side facing the source of illumination for transmitting light from said source of illumination, said background lens including at least one template of a predetermined shape; and at least one indicia mounted in the template capable of transmitting light emitted from said source of illumination towards said observer, each said indicia having a predetermined shape corresponding to a corresponding said template for mounting therein, said indicia conveying a message to said observer during the active state.

2. The device of claim 1, which further includes seal means between said indicia and its corresponding said template for providing a water tight seal therebetween.

3. The device of claim 1, wherein said template forms a cavity in the reverse side of said lens for mounting said indicia therein to mask said indicia during said inactive state.

4. The device of claim 1, wherein said template forms a cavity on the obverse side of said lens for mounting said indicia, said indicia being of a different color than said lens while also being translucent to absorb some of the color of said lens during said inactive state.

5. The device of claim 1, wherein said indicia comprises a plurality of indicia fixedly attached to a mounting means for supporting said plurality, said template penetrating both the obverse and reverse sides of said lens.

6. The device of claim 5, wherein said plurality of indicia are formed in a common mold.

7. A vehicle brake light device for use with a vehicle having a brake light assembly including a lens assembly and a source of illumination directed toward the lens, the source of illumination having an activate state wherein it emits light and an inactive state wherein it does not emit light, the device comprising:

a background lens mounted in said assembly, said lens having an obverse side facing an observer and a reverse side facing the source of illumination for transmitting light from said source of illumination, said background lens including at least one template of a predetermined shape; and at least one indicia capable of transmitting light emitted from said source of illumination towards said observer, each said indicia having a predetermined shape corresponding to a corresponding said template for mounting therein;

said indicia conveying a message to said observer during the active state, said template forming a cavity in the reverse side of said lens for mounting said indicia therein to mask said indicia during said inactive state and said indicia being of a different color than said lens while also being translucent to absorb some of the color of said lens during said inactive state.

8. The device of claim 7, wherein said indicia comprises a plurality of indicia fixedly attached to a mounting means for supporting said plurality.

9. The device of claim 8, wherein said plurality of indicia are formed in a common mold.

10. A vehicle brake light system for use with a vehicle having at least two brake light assemblies each including a lens assembly and a source of illumination directed toward the lens, the source of illumination having an activate state wherein it emits light and an inactive state wherein it does not emit light, the system comprising:

a background lens mounted in each said assembly, said lens having an obverse side facing an observer and a reverse side facing the source of illumination for transmitting light from said source of illumination, at least one said background lens including .at least one template of a predetermined shape; and at least one indicia mounted in the template capable of transmitting light emitted from said source of illumination towards said observer, each said indicia having a predetermined shape corresponding to a corresponding said template for mounting therein, said indicia conveying a message to said observer during the active state.

11. The system of claim 10, which further includes seal means between said indicia and its corresponding said template for providing a water tight seal therebetween.

12. The system of claim 10, wherein each of said templates forms a cavity in the reverse side of said lens for mounting said indicia therein to mask said indicia during said inactive state.

13. The system of claim 10, wherein said each of said templates forms a cavity on the obverse side of said lens for mounting said indicia, said indicia being of a different color than said lens while also being translucent to absorb some of the color of said lens during said inactive state.

14. The system of claim 10, wherein said indicia comprises at least one plurality of indicia fixedly attached to a mounting means for supporting each said plurality.

15. The system of claim 14, wherein said plurality of indicia are formed in a common mold.

* * * * *